(12) United States Patent
Roth

(10) Patent No.: US 10,387,683 B2
(45) Date of Patent: *Aug. 20, 2019

(54) POLICY ENFORCEMENT DELAYS

(71) Applicant: Amazon Technologies, Inc., Seattle, WA (US)

(72) Inventor: Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/261,759

(22) Filed: Sep. 9, 2016

(65) Prior Publication Data

US 2016/0379012 A1    Dec. 29, 2016

Related U.S. Application Data

(63) Continuation of application No. 13/923,004, filed on Jun. 20, 2013, now Pat. No. 9,443,093.

(51) Int. Cl.
*G06F 21/64* (2013.01)
*G06F 21/60* (2013.01)

(52) U.S. Cl.
CPC .......... *G06F 21/64* (2013.01); *G06F 21/604* (2013.01)

(58) Field of Classification Search
CPC .......... G06F 21/604; H04L 29/06986; H04L 29/6578; H04L 29/06585; H04L 29/06591; H04L 29/06598; H04L 29/06605; H04L 63/108; H04L 63/20
See application file for complete search history.

(56) References Cited

U.S. PATENT DOCUMENTS

| | | | |
|---|---|---|---|
| 7,136,489 B1* | 11/2006 | Madhusudhana | H04L 9/085 380/277 |
| 7,478,419 B2 | 1/2009 | Anderson | |
| 7,624,424 B2* | 11/2009 | Morita | G06F 21/6218 726/1 |

(Continued)

FOREIGN PATENT DOCUMENTS

| | | |
|---|---|---|
| CN | 101084693 B | 10/2010 |
| JP | 2006053824 A | 2/2006 |

(Continued)

OTHER PUBLICATIONS

"Communication pursuant to Article 94(3) EPC dated Dec. 5, 2017," European Patent Application No. 14813528.8, filed Jun. 19, 2014, five pages.

(Continued)

*Primary Examiner* — Joseph P Hirl
*Assistant Examiner* — J. Brant Murphy
(74) *Attorney, Agent, or Firm* — Davis Wright Tremaine LLP

(57) ABSTRACT

A request to cancel a change to a policy is received. Based at least in part on delay information for the change, determine that the change is currently delayed, where the delay information is associated with a condition precedent for the change to become effective under a policy change policy. A determination is made regarding whether cancellation is allowed by a set of conditions for the changes, and the proposed policy change is caused to be cancelled prior to a time indicated by the delay information.

20 Claims, 11 Drawing Sheets

(56) References Cited

U.S. PATENT DOCUMENTS

| | | | | |
|---|---|---|---|---|
| 7,774,826 | B1* | 8/2010 | Romanek | H04L 67/306 726/1 |
| 7,853,683 | B1* | 12/2010 | Dini | G06F 9/542 709/202 |
| 7,916,695 | B2 | 3/2011 | Waris | |
| 8,127,336 | B2 | 2/2012 | Bienek | |
| 8,171,522 | B2* | 5/2012 | Vasishth | G06F 21/577 709/223 |
| 8,281,382 | B1* | 10/2012 | Sanyal | H04L 67/22 726/9 |
| 8,315,993 | B2* | 11/2012 | Kaplan | G06F 17/30085 707/662 |
| 8,544,084 | B2* | 9/2013 | Owen | H04L 63/0428 726/19 |
| 8,813,170 | B2* | 8/2014 | Novak | G06Q 50/26 702/183 |
| 2002/0124067 | A1* | 9/2002 | Parupudi | G06F 21/62 709/223 |
| 2004/0225541 | A1* | 11/2004 | Porter | G06Q 10/063 705/70 |
| 2005/0262132 | A1* | 11/2005 | Morita | G06F 21/6218 |
| 2005/0278259 | A1* | 12/2005 | Gunaseelan | G06F 21/10 705/59 |
| 2006/0143685 | A1* | 6/2006 | Vasishth | G06F 21/577 726/1 |
| 2006/0156383 | A1* | 7/2006 | Waris | H04L 41/0893 726/1 |
| 2006/0206440 | A1* | 9/2006 | Anderson | G06F 9/44505 705/500 |
| 2006/0259901 | A1* | 11/2006 | Kaplan | G06F 17/30085 717/168 |
| 2008/0010103 | A1* | 1/2008 | Williamson | G06Q 10/02 705/5 |
| 2008/0066049 | A1* | 3/2008 | Jain | G06F 8/70 717/101 |
| 2008/0216148 | A1* | 9/2008 | Bienek | H04L 41/0893 726/1 |
| 2009/0064310 | A1* | 3/2009 | Nakata | G06F 21/566 726/13 |
| 2009/0125482 | A1* | 5/2009 | Peregrine | G06F 17/30864 |
| 2010/0175105 | A1* | 7/2010 | Vasishth | G06F 21/577 726/1 |
| 2010/0205651 | A1* | 8/2010 | Yanoo | G06F 21/554 726/1 |
| 2011/0209194 | A1* | 8/2011 | Kennedy | G06F 21/55 726/1 |
| 2012/0072562 | A1* | 3/2012 | Johnsen | H04L 12/462 709/223 |
| 2013/0111544 | A1* | 5/2013 | Balinsky | G06F 21/6218 726/1 |
| 2013/0124567 | A1* | 5/2013 | Balinsky | G06F 17/30011 707/783 |
| 2013/0125199 | A1* | 5/2013 | Novak | G06Q 10/04 726/1 |
| 2013/0298185 | A1* | 11/2013 | Koneru | G06F 15/173 726/1 |
| 2014/0137107 | A1* | 5/2014 | Banerjee | G06F 1/3234 718/1 |
| 2014/0201804 | A1* | 7/2014 | Uthmani | G06F 21/60 726/1 |
| 2014/0229739 | A1* | 8/2014 | Roth | G06F 21/6218 713/189 |

FOREIGN PATENT DOCUMENTS

| | | |
|---|---|---|
| JP | 2006107505 A | 4/2006 |
| JP | 2006127504 A | 5/2006 |
| JP | 2006209224 A | 8/2006 |
| JP | 2008219419 A | 9/2008 |
| JP | 2009065294 A | 3/2009 |
| JP | 2009518737 A | 5/2009 |
| JP | 2010211606 A | 9/2010 |
| JP | 2011019129 A | 1/2011 |
| JP | 2011100361 A | 5/2011 |

OTHER PUBLICATIONS

"Notice of Allowance dated Jan. 9, 2018," Japanese Patent Application No. 2016-521818, filed Jun. 19, 2014, 6 pages.

Second Office Action dated Jan. 29, 2018, Chinese Patent Application No. 201480035065.8, filed Jun. 19, 2014, 11 pages.

International Search Report and Written Opinion dated Nov. 3, 2014, in International Patent Application No. PCT/US2014/043246, filed Jun. 19, 2014, 15 pages.

Chinese Third Office Action dated Oct. 26, 2018, Patent Application No. 201480035065.8, filed Jun. 19, 2014, 9 pages.

Japanese Notice of Rejection dated May 14, 2019, Patent Application No. 2018-020756, filed Jun. 19, 2014, 5 pages.

Chinese Decision on Rejection dated Jun. 13, 2019, Patent Application No. 201480035065.8, filed Jun. 19, 2014, 6 pages.

* cited by examiner

POLICY ENFORCEMENT DELAYS

CROSS REFERENCE TO RELATED APPLICATION

This application is a continuation of U.S. patent application Ser. No. 13/923,004, filed Jun. 23, 2013, entitled "POLICY ENFORCEMENT DELAYS," which is incorporated by reference for all purposes.

BACKGROUND

Modern computing networks provide access to a wide variety of computing resources such as data archives, search engines, data processing, data management, communications, electronic marketplaces, as well as media and entertainment services. As the number and size of such computing resources, and their user communities, have grown and become more sophisticated, a need has arisen to establish increasingly sophisticated usage policies. For example, such policies may include policies that address security, privacy, access, regulatory, and cost concerns. However, conventional approaches to policy enforcement have drawbacks.

For example, conventional approaches to policy enforcement can be ad hoc, limited to a particular type of computing resource, and/or limited to a particular set of policy controls. In heterogeneous computing environments incorporating even a modest number of computing resource types, an ad hoc approach can be a significant administrative burden. In addition, some conventional approaches scale poorly as the number of computing resources grows large. Small administrative and/or performance inefficiencies can become problematic at larger scales. Some conventional approaches lack a centralized policy management service which can hamper consistent policy management in distributed computing environments. Some conventional approaches are limited to centralized policy management, which can be insufficiently flexible in response to changing requirements. Policy set complexity can also be a problem for some conventional approaches to policy enforcement.

BRIEF DESCRIPTION OF THE DRAWINGS

Various embodiments in accordance with the present disclosure will be described with reference to the drawings, in which.

DETAILED DESCRIPTION

Figure 1:
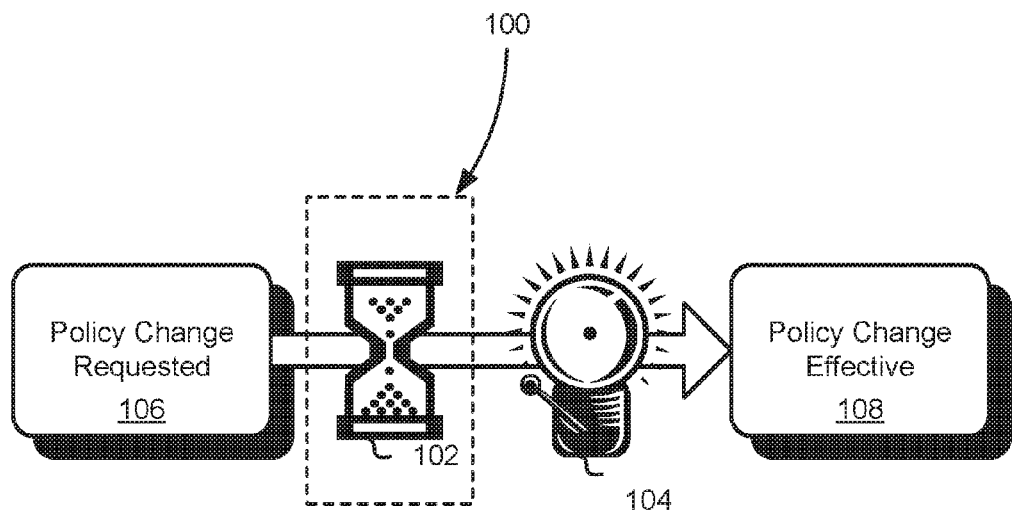
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to effective management of policies in connection with computing resources. A set of policies may be enforced by a computer system to control access to various computing resources. The set of policies may be configurable so that users can add to and/or otherwise change the set of policies as desired. In various embodiments, policies control the ability to change a set of policies. Policies may be crafted, for example, to limit those who are able to change the policies, to limit what changes can be made and otherwise to help ensure that policy changes are beneficial to an entity on behalf of whom the policies are enforced.

In some embodiments, a system enforces a delay before changes to a set of policies become effective. The delay can be generally enforced by the system or may be enforced due to a policy that requires the delay. In an embodiment, when a request to add a policy is received, the request may be approved (e.g., allowed to be fulfilled) or denied based at least in part on whether the request is submitted in accordance with the required delay. For example, the policy requested to be added may include information (e.g., a future time or a duration defining a delay) that indicates when the policy should become effective. As another example, the request may be in the form of an application programming interface (API) call with a parameter that specifies information that indicates when the policy should become effective. The request to add the policy may be fulfilled if the information indicating when the policy should become effective complies with the requirement. In other words, based at least in part on whether the requested policy addition indicates a delay that is greater than or equal to that which is required, the request may be allowed. When a request is allowed to be fulfilled, the system may enable a corresponding policy to become effective in accordance with the information that indicates when the policy should become effective. As discussed below, after enabling the policy to become effective at a future time, the policy may be cancelable before going into effect. Upon cancellation of the policy, the policy may become disenabled from going into effect.

In various embodiments, when a user submits a request to change policy (e.g., add a policy to a set of policies), one or more notifications are triggered. A notification system (e.g., electronic mail system or other system that provides notifications) may be notified and, as a result, the notification system may send notifications to one or more specified parties (e.g. one or more policy administrators, compliance officers, and/or others). The one or more parties may be specified in a policy on adding/changing policy or in another manner and may be specified, in the policy on adding/changing policy, as having authority to cancel policies whose effectiveness is required to be delayed. The notification may also include a mechanism for cancelling the policy change, such as a hyperlink that, if selected, causes the policy change to be cancelled. In this manner, a specified party may be provided opportunity to cancel a policy change that would otherwise be allowed to become effective after the required delay. Further, the conditions for cancelling a policy change that has not become effective (i.e., a policy change that is not yet enforced by the system) may be less stringent than the conditions for cancelling a policy change that has become effective. For instance, the requirements for cancelling a policy not yet in effect may be lower (less stringent) than the requirements for cancelling a policy already in effect. For example, greater authentication requirements may be present for policies already in effect than policies not yet in effect. Further, cancellation of a policy already in effect may require a policy-specified delay whereas cancellation of a policy not yet in effect may not require the delay or may require a shorter delay. Numerous variations are considered as being within the scope of the present disclosure, including, but not limited to, those variations discussed explicitly below.

FIG. 1 is a diagram illustrating various aspects of the present disclosure. As discussed above, systems operating in accordance with the various embodiments described herein allow for effective management of dynamic policy sets. In various embodiments, authorized users may update system policies for various computing resources. Users may, for instance, utilize computer systems that submit appropriately configured application programming interface (API) calls, such as web service calls, to a policy management system 100 of a service provider. As illustrated in FIG. 1, various aspects of the present disclosure relate to delays before requested policy changes 106 become effective 108. In some embodiments, as illustrated by the hourglass in the figure, a policy management system 100 enforces a delay 102 before policies become effective 108. In addition, as illustrated by the alarm bell in the figure, various alarms 104 may be implemented as a result of certain types of requests to change a set of policies. Alarms 104 may be implemented in various ways, such as by electronic notification, enhanced audit logging, actual alarms, and, generally, in any manner that provides notice to one or more interested parties regarding the requested policy change 106. In this manner, an interested party, such as a policy administrator, has the opportunity to cancel the policy change 106 before it becomes effective 108. As discussed in more detail below, enforced delays 102 before policies become effective 108 allow for robust administrative control over which policies a system enforces.

Figure 2:
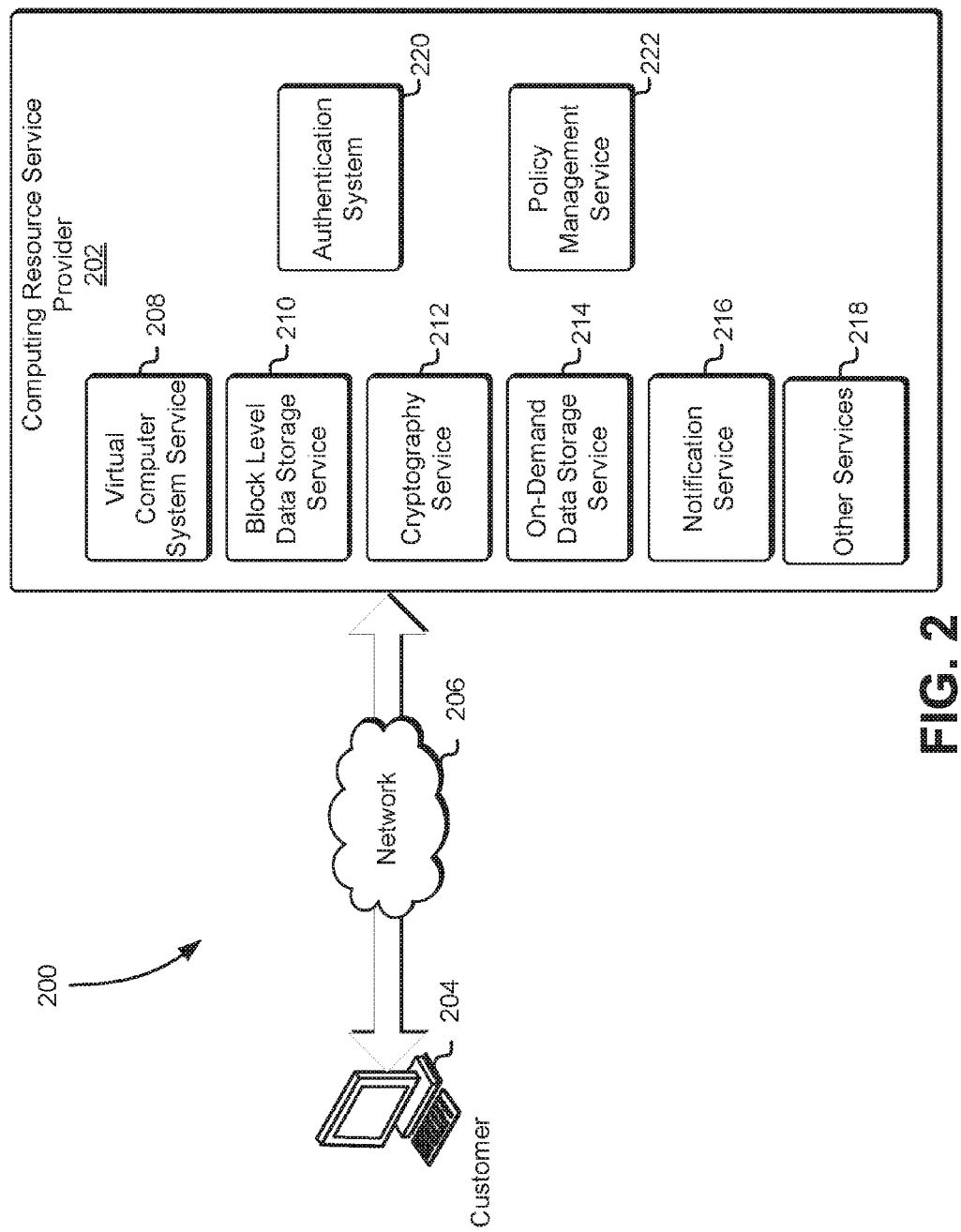
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), an on-demand data storage service 214, and one or more other services 218, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption, and message signing) and/or other operations, such as key rotation. The cryptography service may securely maintain the cryptographic keys to avoid access by unauthorized parties.

The computing resource service provider 202 may also include an on-demand data storage service. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects that may be used by the customer 204 to retrieve or perform other operations in connection with the data objects stored by the on-demand data storage service 210. The on-demand data storage service 214 may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to check or "poll" periodically for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services, and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication system. The request and signatures for the request may be provided to the authentication system that may, using the secret information, compute a reference signature for comparison with the received signature to determine whether the request is authentic.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination. An example policy management system is described below in connection with FIG. 4. Other services and/or components may also be included in the environment 200. Similarly, techniques of the present disclosure apply to other environments.

Figure 3:
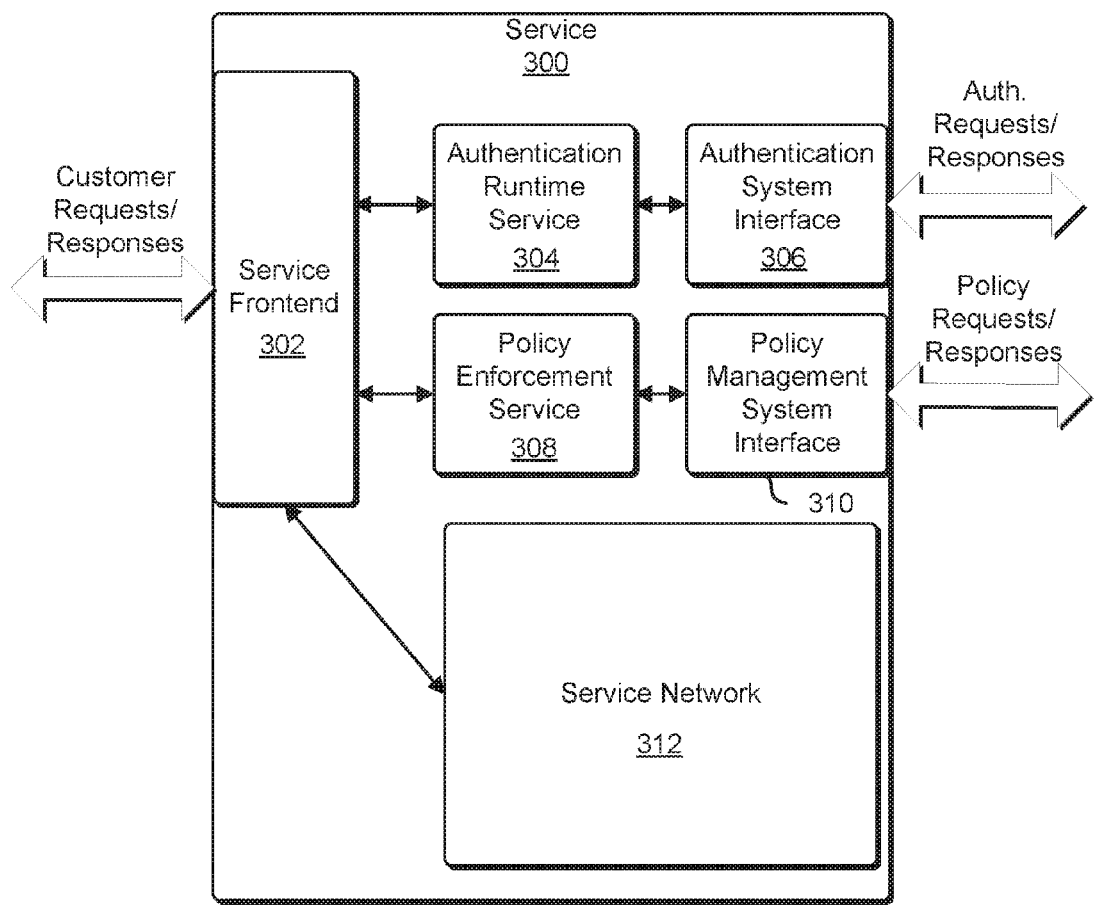
FIG. 3 shows an illustrative example of a service and components that may comprise the service in accordance with at least one embodiment.

FIG. 3 shows an illustrative example of a service 300 in accordance with various embodiments. The service 300 may be, for example, one of the services described above in connection with FIG. 2. For example, the service 300 could be a virtual computer system service 208, a block-level data storage service 210, a cryptography service 212, an on-demand data storage service 214, a notification service 216, or one or more other services 218 such as describe above. It should be noted that while FIG. 3 illustrates various components of the service 300, the various service will vary in accordance with various and may include components different from those illustrated herein. As illustrated in FIG. 3, the service 300 includes a service frontend 302. The service frontend 302 may include a collection of computing resources collectively configured to provide an interface by which customers can communicate such as through application programming interface (API) calls to the service frontend 302. The service frontend 302, for instance, may include one or more web servers, one or more load balancers, one or more application servers, and generally other computing resources described herein.

In an embodiment, the service frontend 302 is configured to receive customer requests and provide responses to those requests. The service frontend 302 may also include an interface that enables the receipt and processing of requests from other services. In order to process the requests, the service frontend 302 may interact with various other components of the service 300. For example, as illustrated in FIG. 3, the service 300 includes an authentication runtime service 304. The authentication runtime service 304, like the service at service frontend 302, may be a subsystem of the service 300 comprising a collection of computing resources collectively configured to make determinations regarding authentication to enable the service frontend 302 to deny or fulfill requests as appropriate. In an embodiment, when the service frontend 302 receives a request the service frontend 302 communicates with the authentication runtime service 304 to determine whether the request is authentic. The request may, for instance, include an electronic signature generated using a secret shared among the customer and an authentication system such as described above in connection with FIG. 2. The authentication runtime service 304 may transmit information via an authentication system interface 306 that enables the authentication runtime service 304 to obtain determinations from an authentication system such as described above in connection with FIG. 2 whether the request is authentic. In operating to determine whether requests are authentic, the authentication runtime service 304 may cache certain information in order to enable the authentication runtime service 304 to make a determination regarding authentication without authentication to an authentication system through the authentication system interface 306. It should be noted that while FIG. 3 illustrates a particular embodiment, the service 300 may authenticate requests in any suitable manner and not necessarily in the manner shown.

As illustrated in FIG. 3 the service frontend 302 also communicates with a policy enforcement service 308 in order to determine whether to fulfill certain requests. The policy enforcement service 308 may be a subsystem of the service 300 that comprises the collection of computing resource collectively configured to enable the service frontend 302 to determine whether to fulfill or deny requests. As with the authentication runtime service 304, the policy enforcement service 308 may communicate with a policy management system (not illustrated in the figure) for the purpose of determining whether fulfillment of a request complies with the policy. For example, when the service frontend 302 receives a request, it may transmit the request or information based at least in part on the request to the policy enforcement service 308. The policy enforcement service 308 may transmit information, via a policy management system interface 310, to a policy management system in order to make the determination. As with the authentication runtime service 304, the policy enforcement service 308 may cache various information in order to enable determinations of whether fulfillment of requests complies with policies without communicating with the policy management system.

In various embodiments, the service frontend 302 also communicates with a service network 312 when received requests are determined to be both authentic and fulfillable in compliance with policy. The service network 312 may be a subsystem of the service 300 comprising a collection of computing resources configured to operate in support of providing a service. For example, in an embodiment whether the service 300 is a virtual computer system service, the service network 312 may comprise a plurality of physical host computing devices that implement virtual computer systems on behalf of customers of the service 300. Requests through the service frontend 302 may relate to operation of the virtual computer systems implemented using the service network 312. For instance, requests may be submitted to the service frontend 302 for the purpose of provisioning, deprovisioning, modifying, or otherwise remotely managing virtual computer systems. In the example of a block-level data storage service 210, the service network 312 may comprise a collection of data storage servers with corresponding data storage devices. The service frontend 302 may interact with the service network 312 for various purposes such as allocating storage space to customers, deallocating storage space for customers, and generally in connection with management of one or more virtual block level data storage devices provided by the service 300. In the example of a cryptography service, the service network 312 may include various hardware devices that enable the secure management of cryptographic keys. For example, the service network 312 may comprise a plurality of security modules (e.g., hardware security modules) which may be devices that securely store cryptographic key material. The service network for a cryptography service may also include data storage devices for storing keys on behalf of customers and generally other devices supporting operation of the cryptography service. In the example of an on-demand data storage service, the service network 312, as with the block data storage service, may include data storage servers and corresponding data storage devices. The service network may also include one or more databases in order to operate as key value stores to enable the efficient location of data within the service network 312. The service network 312 may also include other devices (e.g., server computer systems), such as devices that operate to durably, i.e., redundantly store data to perform garbage collection processes and the like. Generally, the service network 312 may include computing resources applicable to the service being provided. In addition, while not illustrated, the service network 312 may include appropriate networking devices such as routers, switches, load balancers, and other devices that enable the collective operation of the devices in the service network 312. Of course, the exact resources that are included and their collective configuration will vary in accordance with the various services and the various embodiments in which they are implemented.

Figure 4:
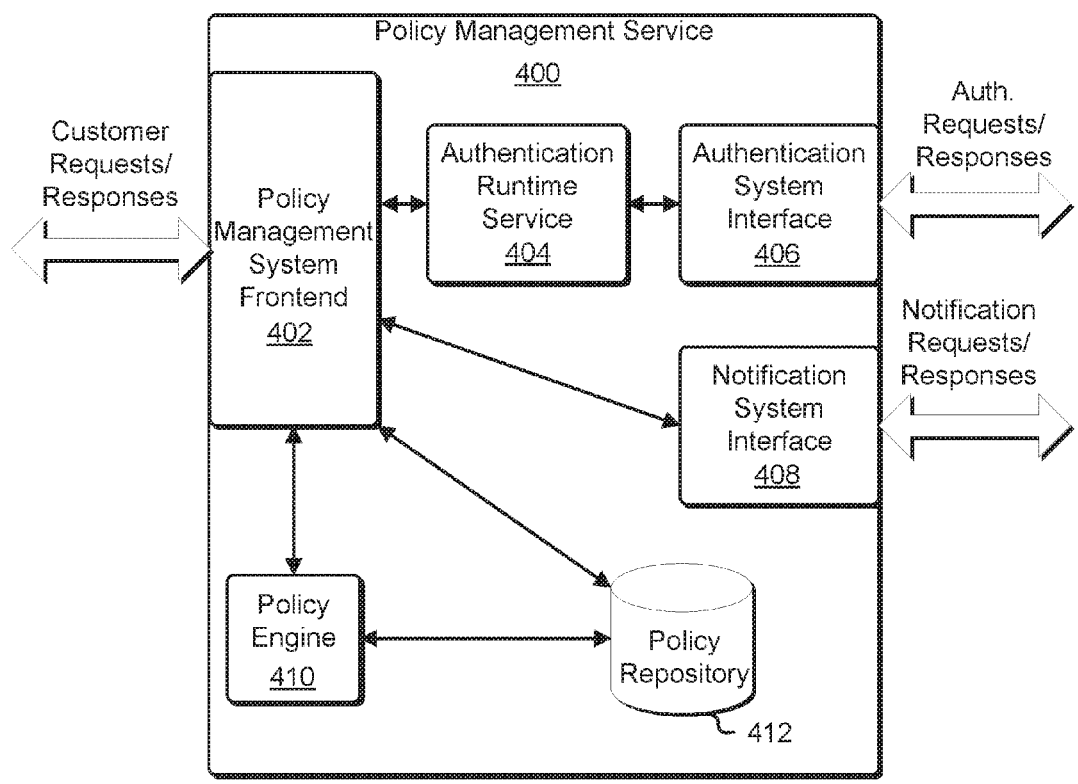
FIG. 4 shows an illustrative example of a policy management service and components that may comprise the policy management service in accordance with at least one embodiment.

FIG. 4 shows an illustrative example of a policy management service 400 in accordance with various embodiments. As illustrated in FIG. 4 the policy management service 400 includes a policy management system frontend 402. The policy management system frontend 402 may be configured, such as the service frontend 302 described above in connection with FIG. 3. In particular, the policy management system frontend 402 may be configured to received customers' requests and provide responses to those requests. The policy management system frontend 402 may also be configured to receive requests from other services, such as for determinations whether requests are fulfillable according to policy. Requests to the policy management system frontend 402 may be various requests in connection with the management of policy or an account of a computing resource provider. For example, a request to the policy management system frontend may be an appropriately configured API call to add a policy, to delete a policy, to change a policy, and generally to perform various actions in connection with policies, such as providing an inventory of policies and the like. As with other frontend systems described herein, the policy management system frontend 402 may include one or more webservers that perform different operations. For example, in an embodiment, the policy management system frontend 402 may include a webserver that provides, over a network such as the Internet, a console interface for managing policies. The console interface may be a graphical user interface (GUI) with various GUI controls that allow users to perform various actions in connection with the management of policy. Example actions include the definition of policies and submission of defined policies. A user may, for instance, use various GUI controls (drop down menus, check boxes, text entry boxes, and the like) for defining a policy and then interact with the GUI to cause the webserver to submit the defined policy. Submission of the defined policy in a request (or, generally, submission of any request transmitted via the GUI), may cause the request to be transmitted from the webserver providing the GUI to another webserver that orchestrates the processing of the requests, such as described below. The other web server may also be available to customers for submission of requests directly instead of through the webserver providing the GUI. Other variations are also considered as being within the scope of the present disclosure.

As with the service 300 described above in connection with FIG. 3, the policy management service 400 may include an authentication runtime service 404 and an authentication system interface 406 in order to enable the policy management system frontend 402 to fulfill or deny requests as appropriate. As with the service frontend 302, the policy management system frontend 402 may interact (e.g., via appropriately configured communication signals) with various components in order to provide policy management services. For example, as illustrated in FIG. 4, the policy management system frontend 402 may utilize a notification system interface 408 to communicate with a notification system such as described above. As discussed in more detail below, the notification system may be used in order to alert users associated with an account of certain types of activity in connection with policy of the account. For example, as noted in more detail below, attempted additions to a set of policies for the account may cause the policy management system frontend 402 to cause the notification system to provide one or more notifications of the attempted policy addition. In this manner, receipt of the notification enables appropriate action to be taken such as when addition of a policy is improper.

The policy management system frontend 402, in an embodiment, utilizes a policy engine 410 which may be a subsystem of the policy management service 400 comprising a collection of computing resources collectively configured to evaluate policy. The policy engine 410 may receive from the policy management system frontend 402 a request that has been received and/or information based at least in part thereon. The policy engine 410 may identify any policies applicable to the request, evaluate whether fulfillment of the request is in compliance with any applicable policies, and provide notification to the policy management system frontend 402 whether fulfillment of the request is in compliance with existing policy. The policy engine 410 may operate in various ways in accordance with various embodiments. For instance, as discussed below, policies may be encoded in policy documents that encode various information regarding principals, resources, and other items to which policies apply. The policy engine (or another system working in concert with the policy engine) may use the information in the policies to determine which, of a set of policies, apply to a particular request. For example, if a request is submitted by a particular identity identified in the request, the policy engine may select policies applicable to that entity. If the request involves a particular resource, the policy engine may select policies that are applicable to the particular resource. In addition, as discussed in more detail below, policy documents may include information that is indicative of whether the policy document is currently effective (i.e., whether one or more policies encoded in the policy document are currently enforced), such as information indicating time when effectiveness of one or more policies encoded in the policy documents begins. Identifying applicable policy documents may include selecting policy documents that are in force and disregarding policy documents that are not in force.

The policy engine may sequentially (or otherwise) process the policies to determine whether each of the selected policies allows fulfillment of the request. The policy engine may transmit a notification (e.g., in the form of a response to a request to evaluate policy submitted by the policy management system frontend 402) to the policy management system frontend 402 that indicates whether the set of policies for an account corresponding to the policies allows or precludes fulfillment of the request. Additional information, such one or more reasons fulfillment of the request is precluded by policy (e.g., information identifying one or more policies that would be violated by fulfillment of the request and/or information based at least in part on the policies that would be violated by fulfillment of the request).

To enable large scale policy management for multiple users, the policy management service 400 may include a policy repository 412 which may comprise one or more data storage devices that store policy documents that encode policies of the various accounts of computing resource service provider. In some embodiments, the policy repository 412 stores policies for multiple entities (e.g., customers of a computing resource service provider) and, accordingly, stores policies in direct or indirect association with the entities to which the policies correspond.

As illustrated in FIG. 4, the policy management system frontend 402 upon receipt of a request may utilize the authentication runtime service 404 to determine whether the request is authentic. If the request is authentic, the policy management system frontend 402 may submit a policy evaluation request to the policy engine 410 to determine whether the request is in compliance with applicable existing policy. The policy engine 410, if it does not have such information cached, may interact with the policy repository 412 in order to obtain applicable policies. The policy engine 410 may, for example, access all policies for an account associated with the request from the policy repository 412 and identify from the access policies any policies that are applicable to the request. As noted, the policy engine may cache policies in order to avoid communication with the policy repository 412 that may be implemented across a network from the policy engine 410.

For certain types of requests, the policy management system frontend 402 may interact with the policy repository 412. For example, if such actions are allowed by existing policy the policy management system frontend 402 may transmit new policies to the policy repository 412, may transmit commands to the policy repository 412 to delete one or more policies, and/or generally to change a set of policies or an account associated with the request (e.g., by modifying an existing policy).

As noted above, various policies utilized by customers of a computing resource service provider may be encoded in the form of policy documents. The policy document in an embodiment is a document (i.e., an organized collection of information) that operates as a container for one or more statements. The policy document may be a JavaScript Object Notation (JSON), an eXtensible Markup Language (XML) document, another document using a structured markup language, or other way of organization information. It should be noted that a policy document may encode one or more policies that are defined by corresponding statements. It should also be noted that a policy may include one or more sub-policies. In other words, a policy may comprise a collection of policies. For example, an account of a computing resource service provider may have a policy for a data storage service ("data storage service policy") that comprises a plurality of individual policies, each defining a specific permission. Additionally, it should be noted that the term "policy" may have different meaning in different contexts. As an example, the term "policy" can have a different meaning when used as an uncountable (mass) noun than when used as a countable (count) noun. For instance, a phrase such as "whether policy allows fulfillment of a request" may be interpreted to mean whether a collection of individual policies allows fulfillment of the request. Also, while policy documents are used for the purpose of illustration, other ways of encoding policies (e.g., by using relational tables of a relational database to store the various information that would be encoded by a policy document) may be used in accordance with various embodiments. A statement may include conditions, which may be any restrictions or details about the statement. The conditions, for example, may specify circumstances for a policy to be in effect.

In various embodiments, policies are able to define conditions for changing a set of policies, such as a set of policies for an account of a computing resource service provider. A policy on policy addition (which may be referred to as a "policy addition policy") may require that, to be fulfillable, a request to add a proposed policy to a set of policies must be configured such that the proposed policy will not become effective (i.e., be enforced by a system that enforces the set of policies) until a future time, such as a specified number of hours into the future measuring from some reference point in time. The policy on policy addition may define the set of principals to which the policy applies, the resources to which the policy applies, one or more other conditions that must be fulfilled, and one or more actions in addition to denial if the conditions are not fulfilled (or, alternatively, allowance if the conditions are fulfilled). An additional action defined by the policy may, for instance, include one or more actions that result in notification of one or more principals of a request to add a policy. A policy administrator may, for instance, allow one or more others to add policies to a set of policies, but may configure a policy on policy addition such that the policy administrator can add policies without a required delay, but the allowed one or more others can only successfully add policies if the policies are added so as to become effective in compliance with a required delay.

Figure 5:
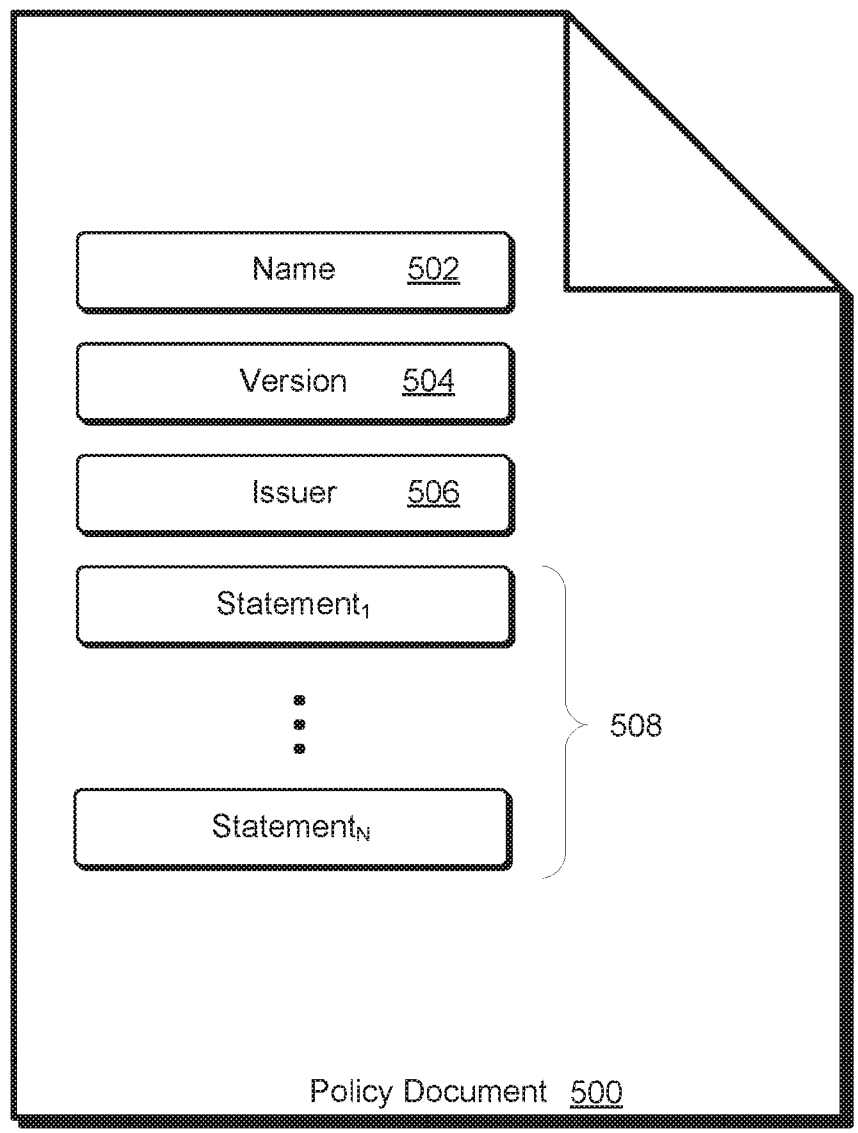
FIG. 5 shows an illustrative example of a policy document in accordance with at least one embodiment.

FIG. 5 shows an illustrative example of a policy document in accordance with an embodiment. In an embodiment, the policy document 500 encodes various information relevant to a policy encoded by the policy document. The policy may be encoded in a declarative access control policy language, such as eXtensible Access Control Markup Language (XACML), Enterprise Privacy Authorization Language (EPAL), Amazon Web Services Access Policy Language, Microsoft SecPol, or any suitable way of encoding one or more conditions that must be satisfied for a cryptographic operation to be performed. As illustrated in FIG. 5, the policy document 500 includes a name 502, which may comprise a string for the policy document 500. The name 502 may, for instance, be used to provide a convenient identifier in using human readable terms. As an example, a name 502 may be a string to the effect of my data storage service policy. Also as illustrated in FIG. 5, the policy document 500 may include a version 504. The version 504 may be used to track how the policy document 500 changes over time as various requests are received and fulfilled to update policy. Each update to the policy document 500 may cause the version 504 to be updated to a new value. The policy document 500 may also include an issuer 506, which may be an identifier for a user that submitted a request that resulted in creation of the policy document 500 having the current version.

As illustrated in FIG. 5 and noted above, the policy document 500 may include one or more statements 508. Statements in a policy document may be processed using a logical OR. As discussed in more detail below, one or the statements 508 may encode information that indicates a future time when the policy encoded by the policy document 500 is to be effective. For example, the statement may encode a time stamp for a future time at which the policy encoded by the policy document 500 is to be effective. A statement may encode a duration indicating an amount of time that must pass before which the policy document 500 is to be effective where the duration may be measured from some point in time, which may be a global time (e.g., Unix time) or which may be measured from a particular event, such as submission of a request to add a policy that contains the statement or approval of the policy by a policy management system. Generally, the statement may encode any information that immediately or eventually renders determinable a future time at which the policy encoded by the policy document 500 becomes effective. It should be noted that statements may also contain additional information that is not illustrated in the figure, such as a statement identifier that uniquely identifies the statement (at least within the policy document), and other information which may be used by a policy management system.

Figure 6:
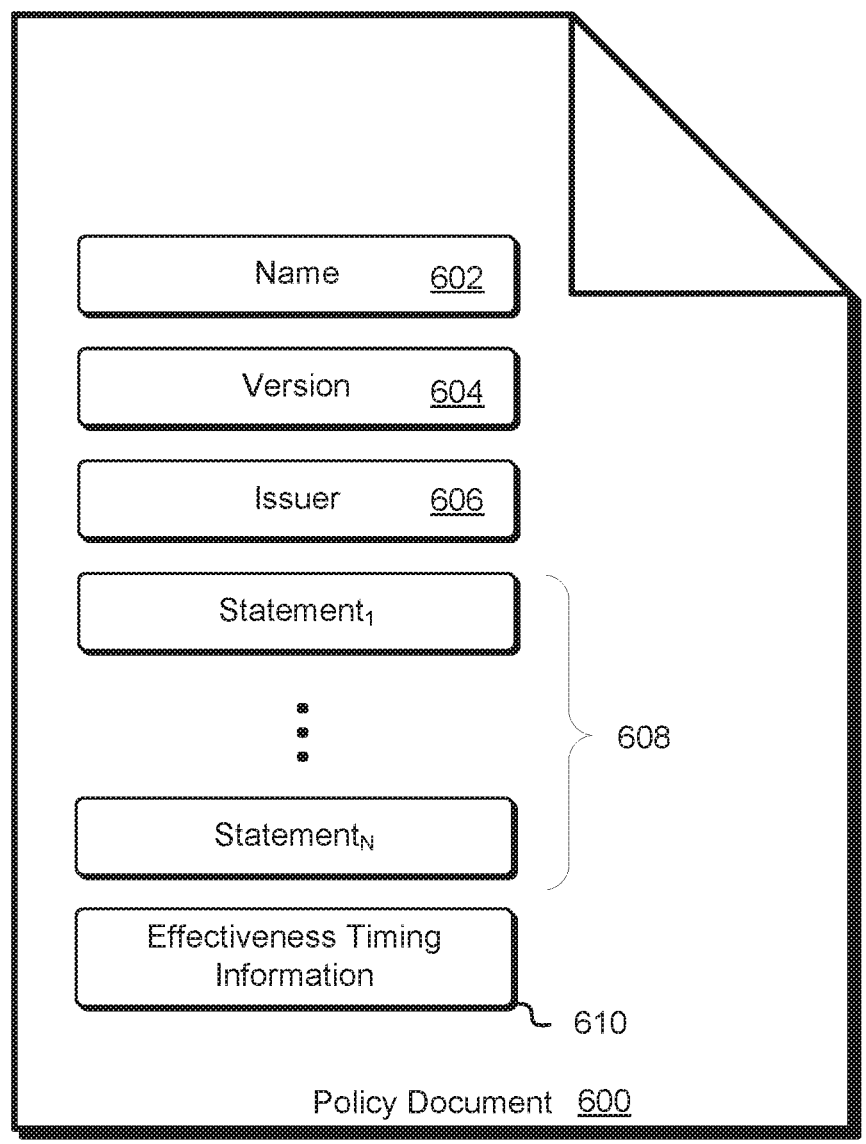
FIG. 6 shows an illustrative example of a policy document in accordance with at least one embodiment.

FIG. 6 shows another illustrative example of a policy document 600 in accordance with various embodiments. The policy document 600 may be configured similarly to the policy document 500 discussed above in connection with FIG. 5. For example, as illustrated in FIG. 6 the policy document 600 may include a name 602, a version 604, an issuer 606, and one or more statements 608 such as described above. However, instead of (or in addition to) a statement 608 being determinative of when a policy encoded by the policy document 600 becomes effective, the policy document 600 may include additional information in addition to the statement 608 and in particular effectiveness timing information 610. In other words, effectiveness timing information may be encoded inside and/or outside of a statement of a policy document. As noted above, the effectiveness timing information 610 may be any information from which a time in the future at which the policy encoded by the policy document 600 becomes effective can be determined. Example effectiveness timing information is discussed above, such as a value indicating a duration or point in time when the policy encoded by the policy document 600 is to be effective.

Figure 7:
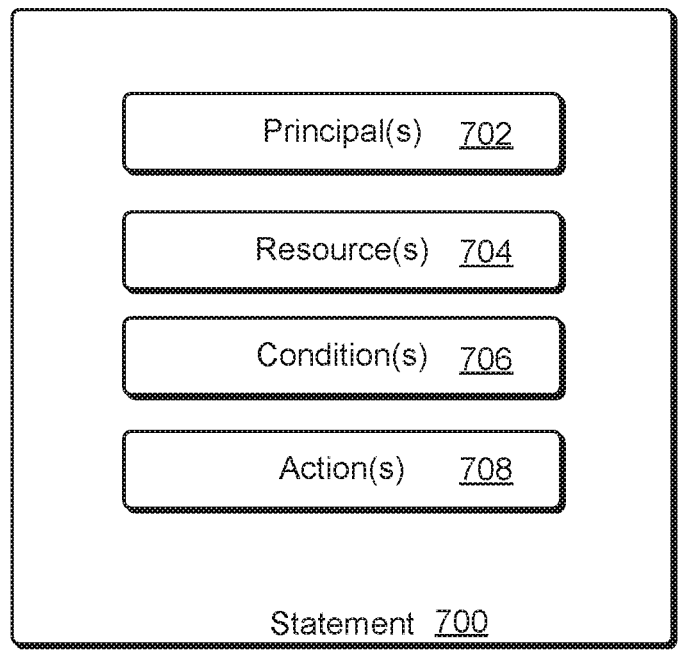
FIG. 7 shows an illustrative example of a statement of a policy document in accordance with at least one embodiment.

As noted above, a statement may be a formal description for a permission. FIG. 7 accordingly, shows an illustrative example of a statement 700 which may be encoded in a policy document, such as described above. As illustrated in FIG. 7, the statement 700 may include information identifying one or more principals 702. A principal may be an entity (e.g., user, computer system, or any entity that may be granted a permission for access to a system) to which the statement 700 applies. As an example, a customer of a computing resource service provider may have an account. The account may be associated with multiple subaccounts each corresponding to a user of the customer. Each user may have a corresponding identifier, which may be includable as a principal in a statement. Principals may also be identified in other ways. For example, sets of principals may be identified by an identifier for the set. As an illustrative example, a department in an organization may have a corresponding identifier. A statement may be applicable to the users associated with the department by listing in the statement an identifier for the department. Identifiers for sets of principals may be useful, for instance, when the sets are dynamically changing such as when employees are hired by and/or leave an organization and/or department therein. Identifiers of principals may also be open ended. For example, information may be included that indicate that the statement 700 is applicable to anyone, that is to all users capable of submitting a request on behalf of an account of a computing resource service provider or, generally, all users.

As illustrated in FIG. 7, a statement 700 also identifies one or more resources 704. Resources may be computing resources such as described above. Resources may, for instance, be the subject of the services provided by a computing resource service provider. As an example, a resource may be a virtual computer system, may be a logical data container used to associate data objects together, may be a volume identifier of a block level data storage device, a database, an item stored in a database, a data object (e.g., file), and generally any type of resource which may be provided as a service. As with principals, resources may be described using identifiers of sets of resources. For instance, in some embodiments, virtual computer systems are able to be associated with user-generated tags that may be descriptive of a role fulfilled by the virtual computer systems. As an example, a group of virtual computer systems may be associated with a tag "web server." Resources, accordingly, may be identified by such tags. As another example, a resource may correspond to a logical data container thereby causing the statement 700 to be applicable any data objects stored within the logical data container, i.e., associated with the logical data container.

As illustrated in FIG. 7, a statement 700 may also include one or more conditions. The conditions, in an embodiment, are determinative of whether the statement in the policy document applies in a particular context, i.e. applies to a submitted request in the context in which it was submitted. The conditions may utilize Boolean operators (equal, less than, etc.) to allow evaluation of the conditions over other values in the statement (principal, resource, etc.) and other values in an authorization context, which may or may not be provided in a request for which policy is being evaluated. Condition values can include date, time, the Internet Protocol (IP) address of the requester, an identifier of the request source, a user name, a user identifier, and/or a user agent of the requester, and/or other values. Values may also be unique to a service to which the condition applies. Conditions may be logically connected for evaluation using logical connectors such as "AND" and "OR."

Statements may also encode one or more actions 708. An encoded action may represent operations that occur when the condition(s) 706 are fulfilled and/or unfulfilled. Example actions include allowing a request to be fulfilled (e.g., allowing requested access) or denying a request. Other actions include transmission of notification in accordance with information encoded in the statement 700, such as transmission of an electronic mail message to one or more electronic mail addresses specified in the statement 700, publishing a notification to a topic of a notification service, and/or other actions. Accordingly, an encoded action 708 may include information sufficient for performing the action.

It should be noted that various embodiments of the present disclosure discuss, in an illustrative manner, requirements that policy defined by a policy document (i.e., a set of one or more policies defined by a policy document) become effective at a future date in compliance with the requirements. In other words, illustrative examples discussed herein relate to requirements that policy documents become effective at future times. As with all embodiments discussed herein, variations are considered as being within the scope of the present disclosure. For example, each statement may include effectiveness timing information that is usable to determine a future time at which the statement goes into effect. Various embodiments may, in alternative or addition to policy-document-level requirements on delayed effectiveness, include requirements on policies defined on a statement level. Determining whether a statement goes into effect may include determining whether each statement (for which a delay is required) complies with a requirement for delay. Different statements in a policy document may have different delays and existing policy on policy changes/additions may have different delay requirements for different statements.

Figure 8:
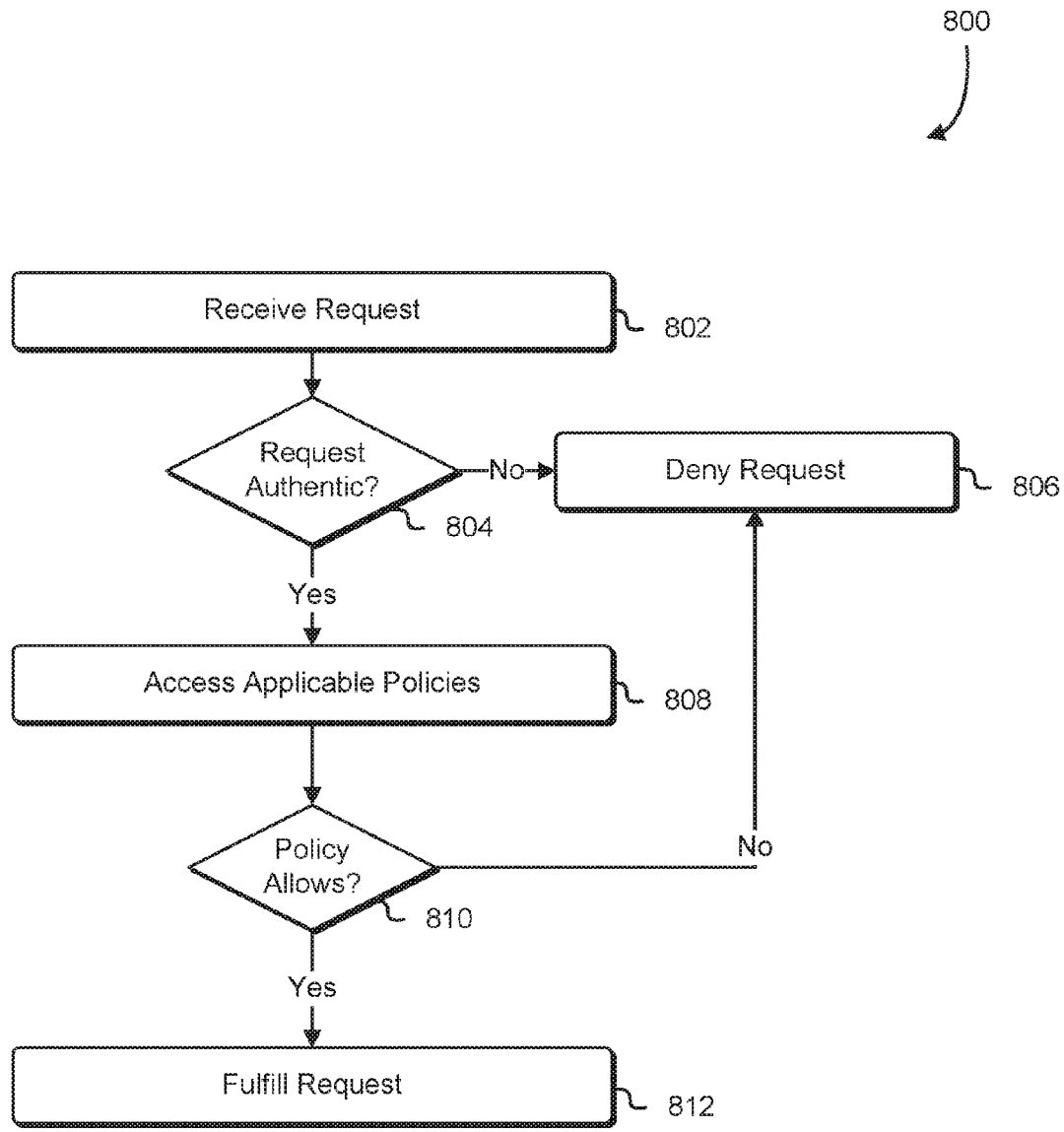
FIG. 8 shows an illustrative example of a process for fulfilling requests in accordance with at least one embodiment.

FIG. 8 shows an illustrative example of a process where processing requests in accordance with an embodiment. The process 800 may be performed by any suitable system or component thereof, such as the service 300 described above in connection with FIG. 3 and/or the policy management service 400 described in connection with FIG. 4. In an embodiment, the process 800 includes receiving 802 a request. The request may be received, for example, as an appropriately configured API call to a frontend system, such as the service frontend 302 or the policy management system frontend 402, described above. The API call may be, for instance, in the form of a web service call configured with various parameters applicable to the request. Upon receipt 802 of the request, the process 800 may include determining 804 whether the request is authentic. Determining 804 whether the request is authentic may be performed in any suitable manner. For example, in some embodiments, the request may be signed with an electronic signature. Determining 804 whether the request is authentic may include verifying the electronic signature. Verification of the electronic signature may be done by any suitable system or component thereof. For instance, referring to embodiments described above, an authentication runtime service or authentication system may perform the verification. It should be noted that the verification may be performed by other entities. For instance, in some embodiments, verification is not done in a distributed manner but done by a frontend system such as described above. Generally, any manner in which the authenticity of the request may be determined may be used.

If it is determined 804 that the request is not authentic, the request may be denied 806. Denying the request may be performed in any suitable manner, such as by responding to the request with information indicating the denial by simply taking no action and/or by providing information that indicates one or more reasons why the request is denied and/or additional information that may be necessary to enable addressing the reason for denial. If, however, it is determined 804 that the request is authentic the process 800 may include accessing 808 one or more applicable policies. Accessing 808 applicable policies may be performed by any suitable system or component thereof, such as by a policy management service described above. Applicable policies may be accessed, for example, by retrieving policy documents from a policy repository such as described above. In some embodiments, timing information indicating when policies become effective is used to select a subset of policies from a set of policies that are applicable (e.g., a set of policies that, without regards to the timing information, would apply to the request). The selected subset may comprise those policies that have timing information indicative of the policies in the subset currently being in effect.

A determination may then be made 810 whether applicable policies allow fulfillment of the request. A determination 810 whether policy allows fulfillment of the request may be performed by any suitable system such as by a policy engine 410 described above in connection with FIG. 4. A policy engine or other system determining whether policy allows fulfillment of the request may analyze applicable policies to determine whether the policy allows fulfillment of the request. As discussed, the manner in which the analysis takes place may vary in accordance with various embodiments. For example, applicable policies or, generally, potentially applicable policies may be analyzed in sequence. If a policy in a sequence of policy would be violated by fulfillment of a request, a determination may be made that policy does not allow fulfillment of the request without analyzing the remainder of the sequence (if any). In addition, determining 810 whether a policy allows fulfillment of the request may include determining, based at least in part on information encoded in a policy document, whether the policy document is currently effective or whether enforcement of the policy documents is being delayed. Determining whether the policy document is currently effective, for instance, may be performed in embodiments where the timing information is not used to exclude policies during performance of one or more previous operations.

More complex processing may also be performed. For example, if a statement in a policy document indicates that fulfillment of the request would violate policy encoded in the statement, a determination may be made whether any additional policies supersede that policy and allow fulfillment of the request. Generally, the policies may be analyzed in any suitable manner, and the manners may vary in accordance with which the various systems are configured and how policies are encoded. If it is determined 810 that policy does not allow the request to be fulfilled, the process 800 may include denying 806 the request such as described above. If, however, it is determined 810 that policy does allow fulfillment of the request, the request may be fulfilled 812.

Figure 9:
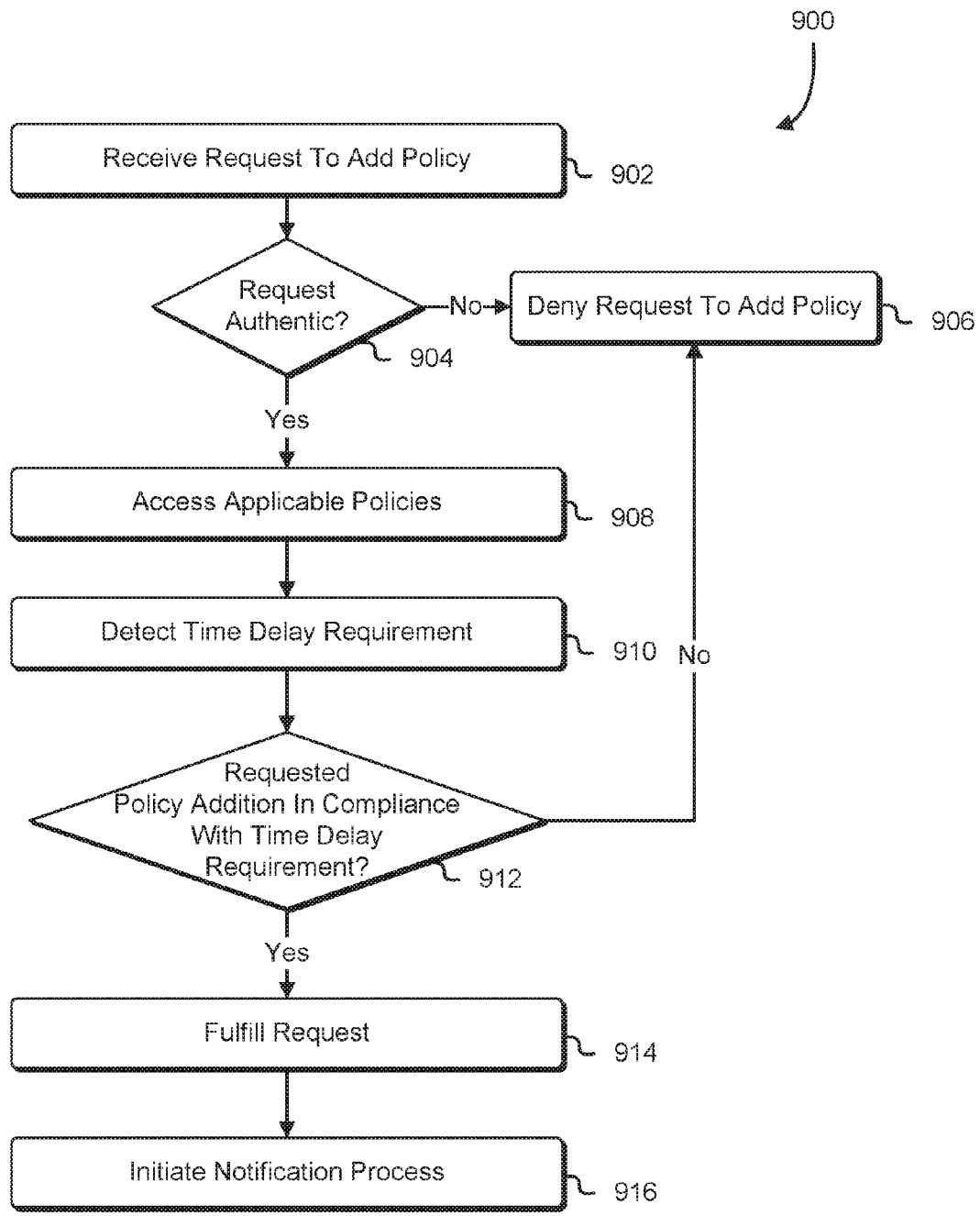
FIG. 9 shows an illustrative example of a process for fulfilling requests to change policy in accordance with at least one embodiment.

As noted above, requests in accordance with the various embodiments may vary greatly. Therefore, fulfillment of the requests may vary accordingly. Generally, fulfillment of a request may include configuring one or more computing resources, providing access to data, and generally performing one or more actions in accordance with the request. As noted above, various embodiments of the present disclosure apply to requests to add or otherwise change policy. FIG. 9 accordingly shows an illustrative example of a process 900 which may be used to enforce policy in connection with changing an existing policies. As illustrated in FIG. 9 the process 900 includes receiving 902 a request to add a policy. The request to add policy may be in the form of an appropriately configured API call. It should be noted that while FIG. 9 discusses a request to add a policy, the process 900 may be adapted for other types of requests such as requests to change an existing policy. In an embodiment, upon receipt 902 of the request to add a policy, a determination may be made 904 whether the request is authentic such as described above. If it is determined 904 that the request is not authentic, the request to add the policy may be denied 906. Denial of the request may be performed such as described above. If, however, it is determined 904 that the request is authentic, the process 900 may include accessing 908 applicable policies such as described above.

As illustrated in FIG. 9 the process 900 includes detecting 910 a time delayed requirement. Detecting 910 the time delay requirement may be performed in various ways in accordance with various embodiments. For example, while omitted from FIG. 9 for the purpose of simplification, while not illustrated in the figure, the process 900 may include processing the accessed applicable policies and determining whether any applicable policies would preclude fulfillment of the request to add the policy. During such processing, a policy that has a time delay requirement may be detected. It should be noted that the time delay requirement is not necessarily encoded in a policy that is stored with other policies, but a system may be coded or otherwise configured to enforce a delay without such a requirement being coded in a policy document. In such embodiments where the time delay requirement is not encoded in a set of policies for an account, it should be noted that detecting the time delay requirement may be performed before the applicable policies are accessed 908. Generally, it should be noted that, while the figures here illustrate various operations occurring in a particular order, in many instances the order of operations may be different from that which is illustrated. In addition, the operations may be performed in a manner that does not follow a strict ordering but, for example, operations may be performed in parallel or at least partially in parallel.

Returning to the particular embodiment illustrated in FIG. 9, upon detection 910 of the time delay requirement, a determination may be made 912 whether the requested policy edition is in compliance with the time delay requirement. The determination 912 may be made in any suitable manner and the manner in which the determination 912 is made may vary in accordance with a manner in which information about the policy is encoded. For example, in embodiments where a future time for the effectiveness of the requested policy to be added is determinable from a statement in a policy document, the statement may be evaluated to determine whether it is in compliance with the time delay requirement. As an illustrative example, the time delay requirement may be that policies may be added only if their effective date is 48 hours into the future. Information encoded in the statement may be analyzed to determine whether a request to add a policy is in compliance with the requirement. Similarly, an embodiment where effectiveness time and information is encoded outside of statement of a policy document, the effectiveness time and information may be analyzed accordingly. For example, an embodiment where the effective time and information comprises a time stamp indicating a time at which the policy requested to be added is to become effective, the time stamp may be checked to determine whether the time stamps is more than 48 hours into the future relative to some reference point in time, such as a time when the request to add the policy was received. Generally, the determination 912 where the requested policy is in compliance with the time delay requirement may be performed in various ways in accordance with various embodiments and the present disclosure is not limited to the embodiments explicitly described here.

If it is determined that the requested policy addition is not in compliance with the time delay requirement, the process 900 may include denying the request to add the policy and may include denying the 906 the request to add policy such as described above. If, however, it is determined 912 that the requested policy addition is in fact in compliance with the time delay requirement, the process 900 may include fulfilling 914 the request such as described above. In various embodiments, when certain changes to policies are requested, one or more notifications may be transmitted. The policy administrator for a customer or computing resource provider may, for example, receive an electronic mail or other electronic message indicating an attempt to change the policy. Accordingly, the process 900 in embodiment includes initiating 916 a notification process. Initiation of the notification process may be performed in any suitable manner such as by causing a notification system, such as described above, to issue one or more notifications to one or more entities.

The notification process may include execution of a workflow configured to cause the performance of various alarm/notification actions. The alarm/notification actions may include, for example, causing a notification system (such as described above) to transmit one or more messages to one or more individuals or systems. For example, a compliance officer or policy administrator of an organization associated with an account associated with the policy set. As another example, an alarm/notification action may comprise causing an auditing system to perform enhanced auditing where, for example, more information is collected in connection with various accesses to the system. In some embodiments, alarm/notification actions may also include alarm signaling which may include audible and/or visual indications of the alarm. Other alarm actions are considered as being within the scope of the present disclosure. Notification may also include transmission of a message including a hyperlink (or other mechanism) that, when selected, causes a request to cancel the request to be transmitted to a system (e.g., policy management system) capable of cancelling the request. The message may allow cancellation without authentication by the receiver of the message. Other methods of enabling the request to be cancelled through notification may also be used.

Figure 10:
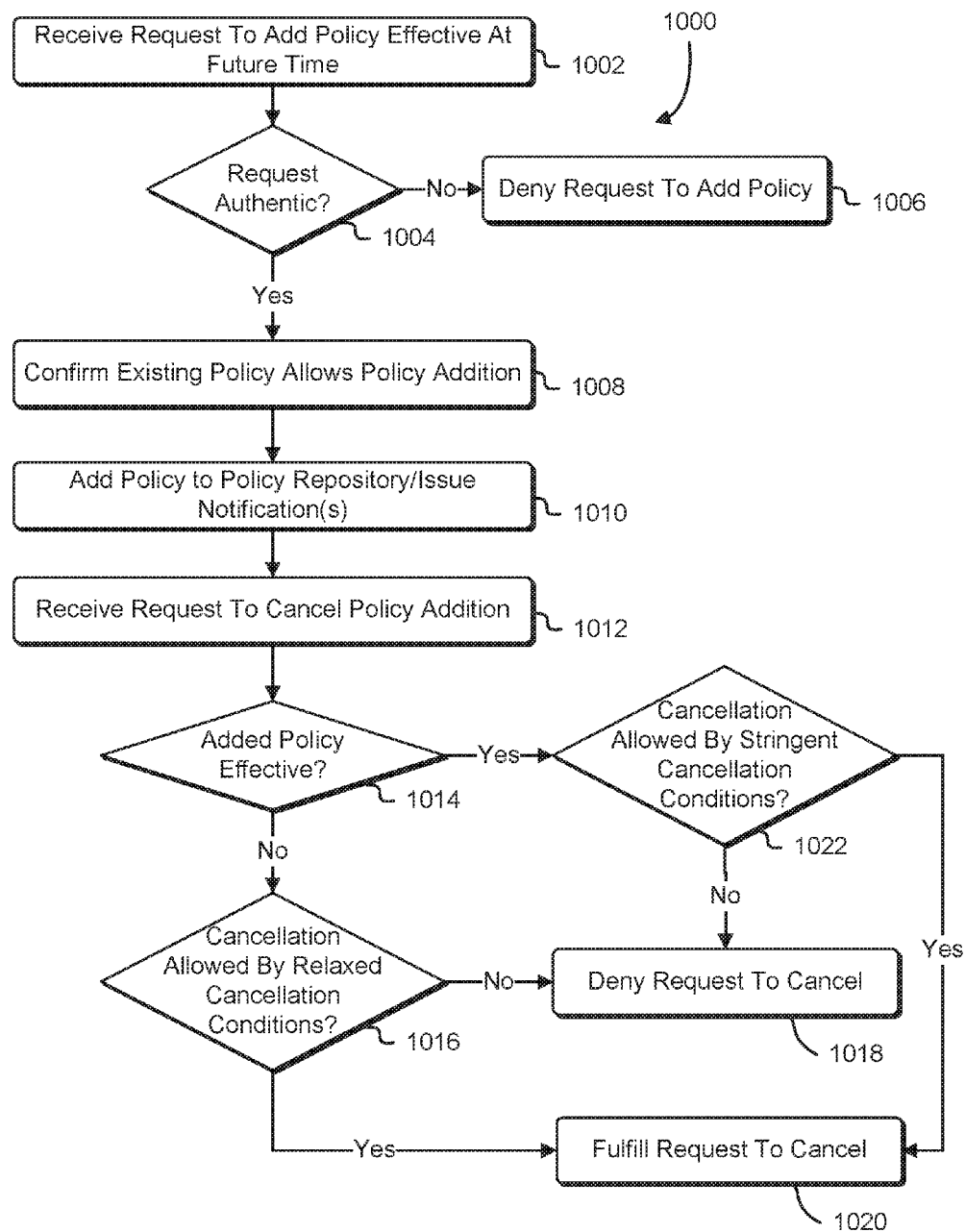
FIG. 10 shows an illustrative example of a process for managing policies in accordance with at least one embodiment.

As noted above in various embodiments of the present disclosure, a delay for the effectiveness of policies is enforced in order to provide opportunity to cancel the effect of such policies. FIG. 10 accordingly shows an illustrative example of the process 1000 that may be used to provide opportunity to cancel policies that would otherwise go into effect if not cancelled. The process 1000 may be performed by any suitable system, such as the system comprising various services in FIG. 2 and/or the policy management service 400 discussed above in connection with FIG. 4. In an embodiment, the process 1000 includes receiving 1002 a request to add a policy effective at a future time. The request to add the policy effective at a future time may be received in any suitable manner such as an appropriately configured API call. The effective time may be encoded in the policy that is requested that may be added or may be otherwise encoded. For example, in some embodiments, the future time or generally effectiveness timing information such as described above is included as a parameter in an API call instead of being within the policy document itself. As discussed above, the determination may be made 1004 whether the request is authentic and if it is determined 1004 that the request is not authentic, the process 1000 may include denying 1006 the request to add the policy.

If however, it is determined 1004 that the request is authentic, the process 1000 may include confirming 1008 that existing policy or generally whether the policy addition is allowed. Confirming 1008 whether the policy addition is allowed may be performed in any suitable manner, such as by performing applicable operations of the processes 800 and 900 described above. It should be noted that while not illustrated in FIG. 10, the process 1000 may include denying 1006, a request to add policy. If it is not confirmed that the policy addition is allowed, upon confirming 1008 that the policy addition is allowed, the policy may be added 1010 to a policy repository and, if applicable, any notifications may be issued, such as described above.

At some point after which the policy is added to the policy repository, a request may be received 1012 to cancel the policy addition, such as described above (e.g., via a notification), or in another manner, such as by logging into an administrative console and using a corresponding GUI to submit the request. Upon receipt 1012 of a request to cancel the policy addition, the process 1000 may include determining 1014 whether the added policy is effective such as described above. For example, effectiveness timing information encoded in a statement or outside a statement of the policy document encoding the policy that was added to the policy repository may be analyzed to determine whether enough time has passed to allow the policy to become effective. If it is determined 1014 that the added policy is not effective, the process 1000 may include determining 1016 whether cancellation is allowed by a set of relaxed cancellation conditions. The relaxed conditions may be less stringent than conditions for cancelling a policy already in effect.

For instance, in embodiments where notifications of a requested policy addition/change provide a mechanism (e.g., hyperlink) for cancelling the policy addition, the policy addition may be cancelled without additional authentication that may be required for a policy already in effect. Similarly, a larger set of principals may be allowed to cancel a policy addition for a policy that is not yet in effect than a set of principals that are able to cancel policies that are in effect. As yet another example, policy changes may require enforcement of quorum rules with respect to principals agreeing to cancellation of the policy changes. Quorum rules may be less stringent for added policies that are not in effect yet than quorum rules for policies that are already in effect. Other examples are also considered as being within the scope of the present disclosure.

If it is determined 1016 that cancellation is not allowed by relaxed cancellation conditions, the process 1000 may include denying the request to cancel and may include denying 1018 the request to cancel and thereby allowing the policy to become effective if the policy is not yet effective and another cancellation request is not received or allow the policy to continue to be effective. If, however, it is determined 1016 that the cancellation is allowed by the set of relaxed cancellation conditions, the process 1000 may include fulfilling 1020 the request to cancel. Fulfilling 1020 the request to cancel may be performed in a simple manner such as by deleting or otherwise removing the policy from the policy repository or electronically marking the policy as not in effect (e.g., by updating metadata for the policy).

If it is determined 1014 that the added policy is effective, a determination may be made 1022 whether cancellation is allowed by a more stringent set of cancellation conditions, such as described above. If is it determined 1022 that the cancellation is not allowed by the more stringent cancellation conditions, the process 1000 may include denying 1018 the request to cancel, such as described above. If, however, it is determined 1022 the cancellation is allowed by the more stringent cancellation conditions, the process 1000 may include fulfilling 1020 the request to cancel the policy addition.

As with all processes discussed herein, variations are considered as being within the scope of the present disclosure. For example, as illustrated in FIG. 10, once it is determined that a policy is in compliance with any time delay requirements, the policy may be added to a policy repository even when the policy is not yet effective. Variations of the present disclosure include embodiments where a system enforces time delay requirements by delaying addition of a policy into a policy repository until the enforced delay has occurred. In this manner, processing a policy to determine whether to fulfill various requests may be performed without determining whether applicable policies have yet to become effective. Other variations are also considered as being within the scope of the present disclosure.

Figure 11:
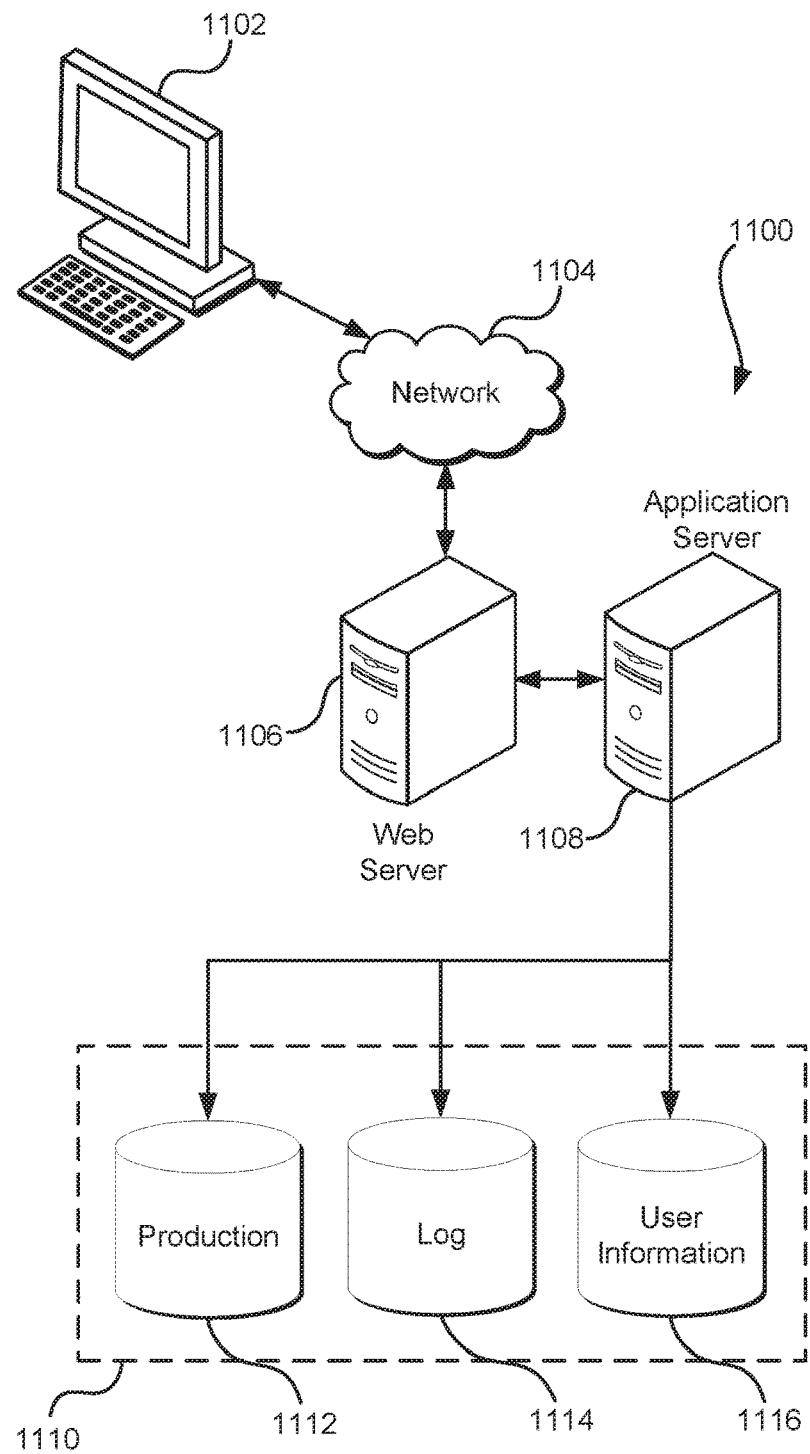
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages, or information over an appropriate network 1104, and convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, or any other such network, or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio, and/or video to be transferred to the user, which may be served to the user by the web server in the form of HyperText Markup Language ("HTML"), Extensible Markup Language ("XML"), or another appropriate structured language in this example. The handling of all requests and responses, as well as the delivery of content between the electronic client device 1102 and the application server 1108, can be handled by the web server. It should be understood that the web and application servers are not required and are merely example components, as structured code discussed herein, can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases, or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the example environment 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response requests from user devices, such as by executing one or more web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving a request to cancel a change to a set of policies, the set of policies being usable by a computer to control access to a computing resource;
determining, based at least in part on delay information for the change, that the change is currently delayed, the delay information associated with a condition precedent for the change to become effective under a policy change policy;
determining, based at least in part on fulfillment of a first set of conditions that are applicable to cancellation of unimplemented policy changes, that cancellation is allowed according to the first set of conditions, the first set of conditions being different from a second set of conditions, the second set of conditions being applicable to cancellation of policies already in effect; and causing, as a result of determining that the change is currently delayed and that cancellation is allowed, the change to the set of policies to be cancelled.

2. The computer-implemented method of claim 1, wherein the change includes an encoding of a policy document that defines a proposed policy, the policy encoded in an access control policy language, the policy document including a value from which compliance with the condition precedent is determinable.

3. The computer-implemented method of claim 1, wherein the first set of conditions is less stringent than the second set of conditions.

4. The computer-implemented method of claim 1, wherein the change is an addition of a policy to the set of policies.

5. The computer-implemented method of claim 1, wherein causing the change to the set of policies includes:
　delaying, for an amount of time, cancellation of the change; and
　on or after the amount of time has passed, cancelling the change.

6. The computer-implemented method of claim 1, wherein determining that cancellation is allowed by the first set of conditions includes determining that a number of principals, in accordance with a first set of quorum rules, agree to cancellation of the change, the first set of quorum rules being less stringent than a second set of quorum rules that specifies a minimum number of the principals needed to agree to be in accordance with the second set of conditions.

7. The computer-implemented method of claim 1, wherein determining that cancellation is allowed by the first set of conditions includes authenticating that a requestor of the change is a member of a first set of principals authorized to cause policy change requests to be cancelled, the first set of principals being larger than a second set of principals authorized to cause policies already in effect to be cancelled.

8. The computer-implemented method of claim 1, wherein the policy change policy further indicates one or more of:
　a principal to which the set of policies apply, or
　a resource to which the set of policies apply.

9. A system, comprising:
　one or more processors; and
　memory including instructions that, as a result of execution by the one or more processors, cause the system to:
　receive a request to cancel a change to a policy, the policy usable by a computer to control access to a computing resource;
　determine, based at least in part on delay information for the change, that the change is currently delayed, the delay information associated with a condition precedent for the change to become effective under a policy change policy;
　make a determination whether cancellation is allowed by a set of conditions for cancelling the change, the set of conditions applicable to cancellation of policies already in effect and different from the condition precedent; and
　cause the change to the policy to be cancelled prior to a time indicated by the delay information.

10. The system of claim 9, wherein the instructions further include instructions that cause the system to verify that the request is received from an entity authorized to cause the change to be cancelled.

11. The system of claim 9, wherein the delay information was received with a previous request proposing the change.

12. The system of claim 9, wherein the request is a web service request received via a hyperlink.

13. The system of claim 9, wherein the instructions that cause the change to the policy to be cancelled include instructions that cause the system to update metadata associated with the change to indicate cancellation of the change.

14. The system of claim 9, wherein the set of conditions for cancelling the change is less stringent than a set of conditions for cancelling the policy itself.

15. The system of claim 9, wherein:
　the instructions that cause the change to the policy to be cancelled are executed on a determination that the cancellation is allowed; and
　the instructions further include instructions that cause the system to, on the determination that the cancellation is not allowed, deny the request to cancel the change.

16. One or more non-transitory computer-readable storage media having collectively stored thereon executable instructions that, as a result of being executed by one or more processors of a computer system, cause the system to at least:
　receive a request to cancel a proposed policy change, the proposed policy change being a change to a policy already in effect, the policy usable by a computer to control access to a computing resource;
　determine, based at least in part on delay information for the proposed policy change, that the proposed policy change is currently delayed, the delay information associated with a condition precedent for the proposed policy change to become effective under a policy change policy;
　determine that cancellation is allowed by conditions for cancelling changes, the conditions for cancelling changes being different from conditions for cancelling the policy already in effect; and
　as a result of the proposed policy change being currently delayed and cancellation being allowed, cause the proposed policy change to be cancelled.

17. The one or more non-transitory computer-readable storage media of claim 16, wherein the request is an application programming interface call.

18. The one or more non-transitory computer-readable storage media of claim 16, wherein the policy already in effect applies to a set of computing resources managed on behalf of a customer of a computing resource service provider; and the proposed policy change and the policy already in effect are encoded in an access control policy language.

19. The one or more non-transitory computer-readable storage media of claim 16, wherein the delay information includes a value indicating a time at which the proposed policy change is to become effective.

20. The one or more non-transitory computer-readable storage media of claim 16, wherein the executable instructions that cause the proposed policy change to be cancelled include executable instructions that delete the proposed policy change from a policy repository.

* * * * *